United States Patent
Smith

[15] 3,662,526
[45] May 16, 1972

[54] DEVICES FOR TOPPING TOBACCO PLANTS

[72] Inventor: Elwood Lee Smith, Elm City, N.C.
[73] Assignee: The Lely Corporation, Elm City, N.C.
[22] Filed: Apr. 14, 1970
[21] Appl. No.: 28,407

[52] U.S. Cl. .................................................. 56/63
[51] Int. Cl. .............................................. A01d 45/02
[58] Field of Search ........................... 56/13.6, 59, 63

[56] References Cited

UNITED STATES PATENTS

| | | | |
|---|---|---|---|
| 3,144,743 | 8/1964 | Gaunt et al. | 56/14.3 |
| 3,482,379 | 12/1969 | Splinter et al. | 56/63 |
| 3,017,732 | 1/1962 | Keyes | 56/13.6 |
| 2,720,740 | 10/1955 | Price | 56/13.6 |
| 2,578,963 | 12/1951 | Bell | 56/13.6 |
| 1,053,278 | 2/1913 | Cloud | 56/59 |
| 2,958,175 | 11/1960 | Sprinkle | 56/13.6 |
| 2,977,741 | 4/1961 | Stroman | 56/13.6 |
| 3,422,610 | 1/1969 | Wetherell | 56/63 |

*Primary Examiner*—Russell R. Kinsey
*Attorney*—Mason, Mason & Albright

[57] ABSTRACT

A transportable device for topping plants includes a frame with at least one cutter on a support mounted laterally of the frame. The frame has portions for adjusting the height of the cutter and the cutter support can be moved along the frame to horizontally adjust the position of the cutter. An endless feeding member for each cutter is moved to bring the tops of plants in the path of the cutter and the feeding member, as well as the cutter, is moved by belt transmission. The device can be an attachment that is coupled to the conventional three point lift of a tractor with vertical beams connected to the three point lift and horizontal beams connected to the vertical beams laterally of the tractor. Guides adjacent the endless member and plates adjacent the cutter act to guide the plants and their cuttings as the device is moved along rows of plants.

14 Claims, 3 Drawing Figures

INVENTOR
ELWOOD LEE SMITH

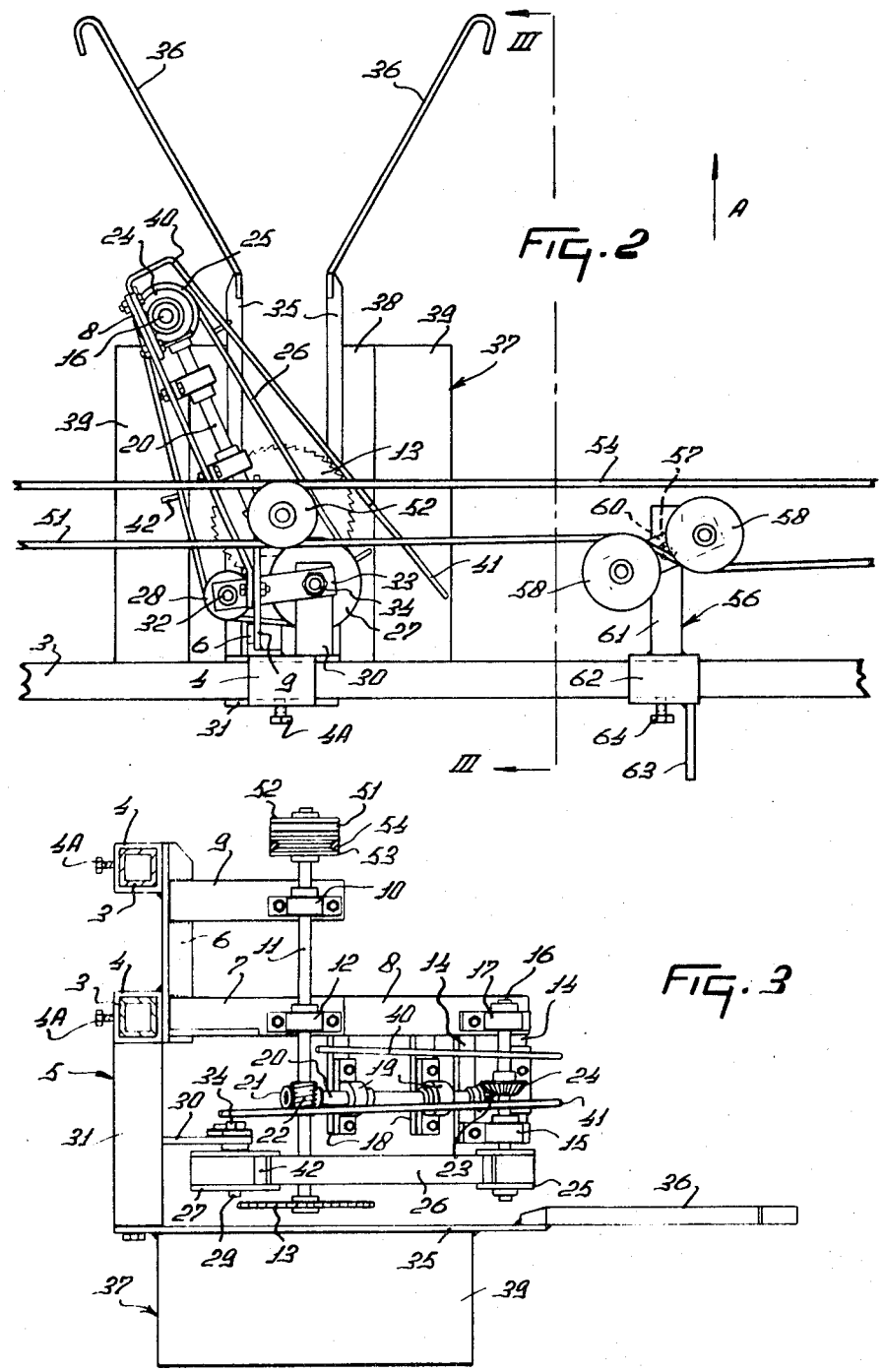

DEVICES FOR TOPPING TOBACCO PLANTS

With the devices of the kind set forth hitherto known the topping mechanisms not only cut the flowering top but also a portion of the topmost leaves during the movement of the machine. The cut portions drop down on the subjacent leaves, where they are often left. Cutting of the topmost leaves and the cut portions lying on the lower leaves often give rise to damage of the leaves due to fungal diseases so that the quality of the leaves may be drastically reduced.

The invention has for its object to obviate the aforesaid disadvantages and to provide a very simple, cheap and efficiently operating machine.

According to the invention this is achieved by providing beneath the cutter a screening part, which is located in operation above the leaves so that the cut tops are diverted via the screen to the ground.

A very advantageous construction is obtained by providing one endless feeder so that topping can easily be performed as far down as between the upper leaves.

For a better understanding of the invention and to show how the same may be carried into effect, reference is made by way of example to the accompanying drawing.

FIG. 2 is a plan view in the direction of the arrow II of a topping mechanism of the device.

FIG. 3 is an elevation taken on the line III—III in FIG. 2.

Figure 1:
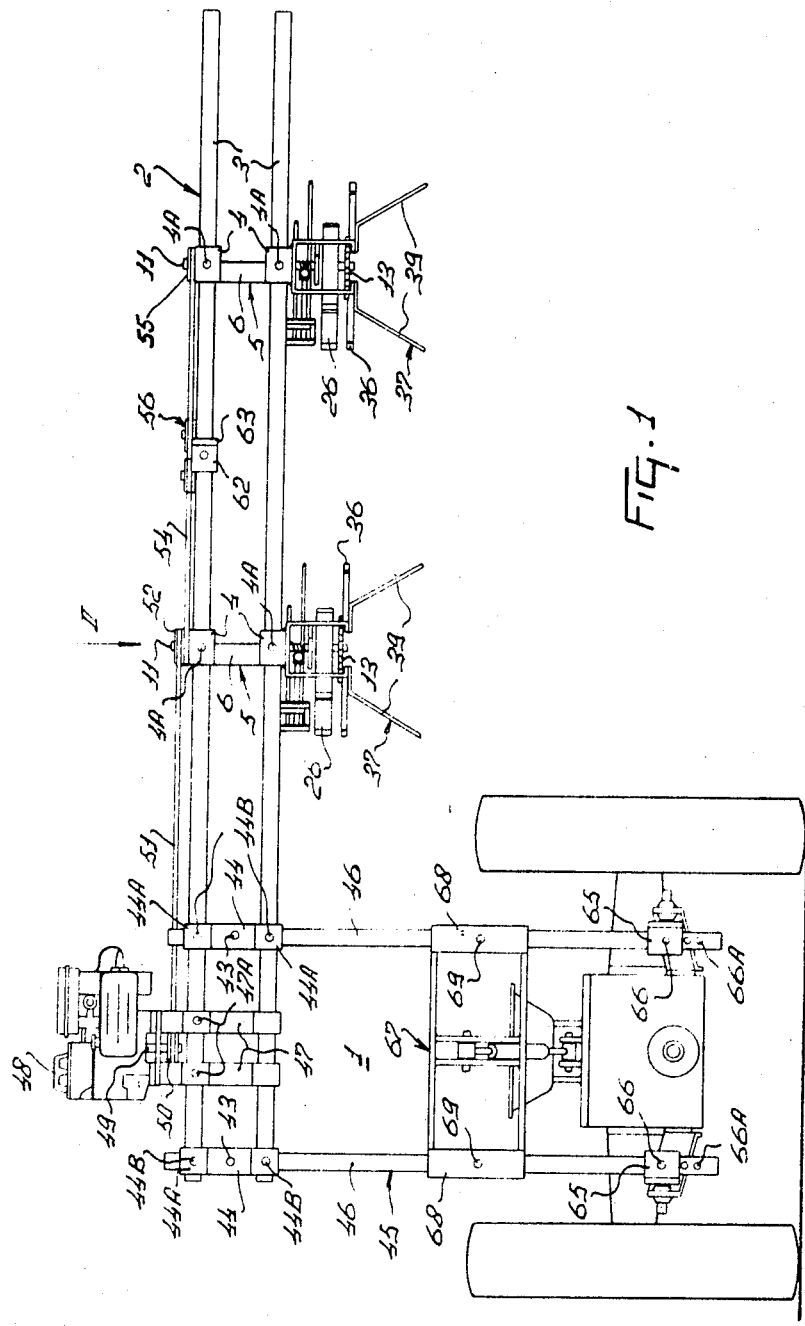
FIG. 1 is a rear view of a device in accordance with the invention attached to the lifting device of a tractor.

The construction shown in the Figures is that of a machine for topping tobacco plants, comprising a frame 1 having a frame portion 2 extending transversely of the direction of movement, said portion having two identical parallel frame beams 3, lying one above the other with each having a square cross-section. Two supports 5 are arranged at a distance from each other on the frame beams 3 by means of sleeves 4. Each of the sleeves 4 is slidable along a frame beam 3 and can be fixed in place by means of a bolt 4A. Each support 5 comprises a vertical supporting member 6, to which is attached by means of a support 7 a horizontal arm 8 inclined forwardly in the direction of movement of the device. Above the arm 8 the supporting member 6 is provided with a horizontal strip 9, which holds a bearing 10 for a vertical shaft 11, which is furthermore journaled in a bearing 12 on the support 7. The lower end of the shaft 11 is provided with a cutter 13, formed by a disc having a serrated periphery.

The end of the arm 8 remote from the supporting member 6 is provided with strips 14, which extend in a vertical direction. The lower ends of the strips 14 are provided with a bearing 15 for receiving a vertical shaft 16, which is otherwise journaled in a bearing 17 on the arm 8. The arm 8 is furthermore provided with vertical strips 18, to which is attached a substantially horizontal shaft 20 by means of bearings 19. The shaft 20 is adapted to co-operate at its end lying hindmost in the direction of movement by means of a pinion 21 and a worm 22 on the shaft 11 to which the cutter 13 is secured. The front end of the shaft 20 is provided with a bevel gear wheel 23, which is adapted to co-operate with a bevel gear wheel 24 on the shaft 16. At the lower end the shaft 16 is provided with a roller 25, about which an endless feeder 26 formed by a belt is passed. The belt is furthermore passed about rollers 27 and 28 both located behind the cutter 13, viewed in the direction of movement. The roller 27 is adapted to rotate about a vertical shaft 29, secured to a support 30 held by a bracket 31, arranged on the lower sleeve 4, by means of which a support 5 can be slid along the lower beam 3 of the frame portion 2. The roller 28 is adapted to rotate about a vertical shaft 32, arranged on an arm 33, which is adjustably arranged on the shaft 29 for adjustment of the belt tension. The arm 33 is hereto fastened by means of a nut 34 on the shaft 29. The rollers 25, 27 and 28 adapted to rotate about vertical shafts for the endless feeder 26 are arranged so that the portion of the feeder 26 engaging the tops of the tobacco plants to be cut, that is to say the active portion of the feeder is inclined to the rear as viewed in the direction of movement (FIG. 2). Beneath the cutter 13 the bracket 31 is provided with forwardly projecting, parallel, horizontal strips 35, which are each provided with a guide member 36 located adjacent the level of the foremost roller 25 of the feeder 26. The guide members 36 (see FIG. 2) are arranged in V-shaped fashion and each guide member 36 is bent over at the front end in outward direction. Each of the strips 35 has attached thereto a laterally extending plate 37 having a horizontal mounting portion 38 and a further portion 39 extending outwardly and downwardly at an oblique angle from said horizontal portion. The two plates 37 form a screen for guiding the tops of the tobacco plants cut by the cutter 13 towards the ground and for screening the upper leaves. The foremost strip 14 is provided with rearwardly inclined spring-steel tines 40 and 41, lying one above the other. The lower tine 41 is longer than the upper tine 40. The tines 40 and 41 are arranged so that they extend in front of and at least substantially parallel to the active portion of the endless feeder 26, while they are located above said feeder (FIGS. 2 and 3). The endless feeder 26, which is formed, as stated above, by a belt, is provided with cleats 42 at right angles to said belt at regular intervals. The cleats 42 are preferably made of rubber. At one end the frame portion 2 is supported for vertical displacement by means of sleeves 44 and associated with a frame portion 45, which is to be attached to the lift of a tractor and which comprises two vertical frame beams 46, which are of the same structure as the frame beams 3 of the frame portion 2. The sleeves 44 can be fixed in place by means of clamping bolts 43. The sleeves 44 are each provided with guides 44A, in which the beams 3 of the frame portion 2 can be fixed in various places by means of clamping bolts 44B,. The device can thus be reduced in width for transport purposes. The two frame beams 3 of the frame portion 2 are provided between the vertical frame beams 46 with supports 47, on which an engine 48 is arranged for driving the various movable parts of the topping mechanisms. The supports 47 are secured to frame portion 2 by means of clamping bolts 47A. For driving purposes a vertical shaft 49 on the lower side of the engine 48 is provided with a pulley 50, which is linked by a belt 51 to a pulley 52 on the top end of the vertical shaft 11, which holds the cutter 13 in the topping mechanism nearest the engine 48. A second pulley 53 on the shaft 11 is linked by a belt 54 to a pulley 55 on the shaft 11 of the topping mechanism remote from the driving engine 48. A belt tension member 56 is provided in association with the belt between the two topping mechanisms, said member being formed by two rollers 58 rotatably arranged on an arm 57 having arranged between them a portion of the belt 54. The arm 57 is adapted to be turned and fixed in position relatively to a support 61 in a plurality of positions by means of a bolt 60. The support 61 is adapted to slide by means of a sleeve 62 along the upper beam 3 of the frame portion 2. The sleeve 62 is provided for this purpose with an arm 63 and a bolt 64. When adapting the positions of the respective topping mechanisms to the interval between the rows of plants the stress in the belt 54 between the two mechanisms can be restored by means of the member 56. In the construction described above the two topping mechanisms together with the driving engine 48 can be displaced laterally along the frame beams 3 of the frame portion 2. In practice, however, it will be sufficient to displace the topping mechanism nearest the engine for matching the interval between the rows. The beams 46 of the frame portion 45 are provided below with vertically adjustable sleeves 65, adapted to be coupled with the lower arms of the lift of the tractor. For the displacement of the sleeves 65 a bolt 66 is provided, which can be passed through a hole in the sleeve and through one of a plurality of holes 66A that are vertically spaced in each of the beams 46. Between the beams 46 is arranged a coupling member 67 for connection with the upper arm of the lift. The coupling member 67 is adjustably arranged between the frame beams 46 by means of sleeves 68 and clamping bolts 69.

The construction described above operates as follows: In operation the device, which as stated above can be attached by means of the frame portion 45 with the vertical frame beams 46 to the lift of a tractor, is moved in the direction of the arrow A (FIG. 2). The topping mechanisms are displaced relatively to each other along the frame beams 3 of the transverse frame portion 2 to an extent such that they match the distance between two rows of tobacco plants, where the small-sized tractor is riding. By means of the vertical adjustment of the transverse frame portion 2 the height of the topping mechanisms can be adjusted so that the tops located between the upper leaves can be removed by means of the cutter 13. During the movement the tops are guided between the guide members 36 arranged in V-shaped fashion viewed in the direction of movement until they get into the range of the cleats 42 of the endless feeder 26. By means of the cleat 42 on the active portion of the feeder 26 inclined to the direction of movement the tops to be cut are guided towards the rotating serrated, disc-shaped cutter 13 until they are cut thereby,. The cut tops are thrown also by means of the resiliently arranged tines 40 and 41, located above the feeder 26, onto the screen formed by the plate 37, which guide them towards the ground. The plate-shaped screens on either side of the cutter prevent in addition damage of the topmost leaves. By means of the plate screens it is possible to top without damaging the leaves, also because of the presence of only one endless feeder 26. An effective discharge of the cut tops is furthermore ensured by the resilient tines 40 and 41, which are arranged above the endless feeder 26 and which are caused to vibrate via the frame portion 3 by the engine 48. The cut tops are thus thrown laterally to the ground along the plates 37 so that they are not left on the leaves, which might thus be deteriorated. The presence of a separate driving engine 48 has the advantage that the speed of rotation of the cutters 13 can be adapted to the speed of travel of the device. By the displaceability of the topping mechanisms and, as the case may be, the displaceability of the driving engine 48 the positions of the topping mechanisms can be adapted readily to the distance between the rows of plants. The height can be simply adjusted by shafting in a direction of height the frame portion 45 coupled with the tractor. When adjusting the positions of the topping mechanisms the adjustable stretching rollers 58 arranged between the mechanisms in the driving gear restore the correct belt stress of the belt 54. The cutter 13 is provided with Teflon coating so that it remains clean.

The construction depicted above provides a highly efficient, readily controllable device for topping tobacco plants so that the leaves of the plants are completely safeguarded against damage, while the device allows high-speed operation so that per unit time a larger area can be worked than by the machine hitherto known.

The frame beams 3 and 46 of the frame portions 2 and 45 are identical so that manufacture is simplified. The construction of the frame is furthermore such that it can be dismounted readily.

Instead of using a cutter with serrations a cutter without serrations may be employed.

Having thus described my invention, what I claim as new and desire to secure by Letters Patent of the United States is:

1. A transportable device for topping tobacco plants comprising a frame and a plurality of movable cutters, each of said cutters being mounted on a movable support on a frame part which extends laterally from the remainder of said frame, a movable endless feeder member for each cutter being mounted on pulley means journaled to said frame part to move said endless member in a path adjacent its respective cutter and to feed plants to said cutter, screening plate means supported on said frame to extend adjacent said cutters on each side thereof whereby cuttings from the plants are guided towards the ground away from the remainder of the plants by said screening plate means, each of said cutters being a rotatable disc mounted adjacent said endless feeder member on a vertical shaft journaled to said frame part.

2. A device as claimed in claim 1, wherein said screening plate means comprises a horizontal portion and at least one downwardly inclined portion positioned adjacent each cutter to guide cutings away from the remainder of the plants, and two adjacent plate-screens of said plate means are mounted adjacent each cutter so that the respective horizontal portions of said screens face each other with their respective cutter being located between said inclined portions.

3. A device as claimed in claim 2, wherein two cutters, each with a feeder member and tines, are mounted on their respective movable supports and spaced apart from each other, said cutters being journaled on said frame part extending transversely of the direction of travel and a separate source of energy is mounted on said frame in driving connection with said cutters and their respective endless feeders.

4. A device as claimed in claim 1, wherein said cutters and endless feeder members are displaceable horizontally relative to a source of energy for driving said cutters and their respective endless feeder members, said cutters being affixed to their respective supports on the frame part which extends transversely of the direction of travel of said device.

5. A device as claimed in claim 4 wherein said source of energy is in driving engagement with belt means which interconnect said cutters and said endless feeder members and, wherein between two cutters an adjustable belt stretching member is positioned on said frame part to adjust said belt means to the correct stress, said stretching member comprising two stretching rollers on an arm turnable about a vertical shaft and setable in a plurality of positions.

6. A device as claimed in claim 1, wherein said frame part comprises horizontal frame beams lying one above the other which are vertically slidable relative to two spaced apart vertical frame beams of the remainder of said frame and said vertical frame beams are connectable to the three point lifting device of a tractor.

7. A device as claimed in claim 6, wherein said horizontal frame beams are identical and exchangeable.

8. A device as claimed in claim 1, wherein said cutter is circular and has serrations at its periphery.

9. A transportable device for topping tobacco plants comprising a frame and a plurality of movable cutters, each of said cutters being mounted on a movable support on a frame part which extends laterally from the remainder of said frame, a movable endless feeder member for each cutter being mounted on pulley means journaled to said frame part to move said endless member in a path adjacent its respective cutter to feed plants to said cutter, resilient tine means secured to said frame and extending adjacent said cutter to conduct plant tops being cut away from the remainder of said plants.

10. A device as claimed in claim 9, wherein said tine means comprises tines extending above said feeder member.

11. A device as claimed in claim 10, wherein said tines are positioned adjacent an engine mounted on said frame for driving said cutters and said feeder members, whereby said engine induces vibratory movements for said resilient tines.

12. A device as claimed in claim 9, wherein said resilient tines are at least partly inclined to extend towards the rear of said device, said tines extending substantially parallel to a portion of said feeder member.

13. A transportable device for topping tobacco plants comprising a frame and at least one cutter, said cutter being mounted on a movable support on a frame part which extends laterally from the remainder of said frame, a movable endless feeder member for said cutter being mounted on pulley means journaled to said frame part to move said endless member in a path adjacent said cutter and to feed plants to said cutter, screening plate means supported on said frame to extend adjacent said cutter on each side thereof whereby cuttings from the plants are guided towards the ground away from the remainder of the plants by said screening plate means, said cutter being a rotatable disc mounted adjacent said endless feeder member on a vertical shaft journaled to said frame part.

14. A transportable device for topping tobacco plants comprising a frame and at least one cutter, said cutter being mounted on a movable support on a frame part which extends laterally from the remainder of said frame, a movable endless feeder member for said cutter being mounted on pulley means journaled to said frame part to move said endless member in a path adjacent said cutter to feed plants to said cutter, resilient tine means secured to said frame and extending adjacent said cutter to conduct plant tops being cut away from the remainder of said plants.

* * * * *